(12) United States Patent
Doll et al.

(10) Patent No.: US 8,356,784 B2
(45) Date of Patent: Jan. 22, 2013

(54) CAMOUFLAGE BRANCH HOLDING AND POSITIONING APPARATUS AND METHOD FOR USING THE SAME

(75) Inventors: Corey J. Doll, Grand Rapids, MI (US); John E. Schindlbeck, Fruitport, MI (US)

(73) Assignee: Carnivore Hunting Products, LLC, Fruitport, MI (US)

( * ) Notice: Subject to any disclaimer, the term of this patent is extended or adjusted under 35 U.S.C. 154(b) by 282 days.

(21) Appl. No.: 12/652,432

(22) Filed: Jan. 5, 2010

(65) Prior Publication Data

US 2010/0171007 A1 Jul. 8, 2010

Related U.S. Application Data

(60) Provisional application No. 61/142,517, filed on Jan. 5, 2009.

(51) Int. Cl.
*A47B 96/00* (2006.01)
*A47G 1/10* (2006.01)

(52) U.S. Cl. ........... 248/229.13; 248/231.51; 248/316.1; 269/44

(58) Field of Classification Search ............... 248/316.1, 248/316.2, 316, 316.7, 316.8, 231.51, 231.81, 248/230.1, 229.13, 229.15, 229.16; 24/327, 24/338, 510, 521, 563, 489, 513, 517; 269/44, 269/45, 74, 75, 76, 95, 97
See application file for complete search history.

(56) References Cited

U.S. PATENT DOCUMENTS

| | | | | |
|---|---|---|---|---|
| 1,032,436 | A * | 7/1912 | Smith | 24/331 |
| 1,684,347 | A * | 9/1928 | Dobbs | 248/229.13 |
| 2,510,181 | A * | 6/1950 | Jury | 248/231.51 |
| 4,211,380 | A * | 7/1980 | Lillegard et al. | 248/316.7 |
| 4,277,864 | A * | 7/1981 | Orson, Sr. | 24/327 |
| 4,678,153 | A * | 7/1987 | Maddock et al. | 248/229.13 |
| 5,666,702 | A * | 9/1997 | Ming-Chieh | 24/510 |
| 6,804,866 | B2 * | 10/2004 | Lemke et al. | 24/338 |
| 7,178,777 | B1 * | 2/2007 | Banker | 248/316.7 |

* cited by examiner

*Primary Examiner* — Tan Le
(74) *Attorney, Agent, or Firm* — Price Heneveld LLP

(57) ABSTRACT

A method and fixtures for holding natural or artificial material which can be used by hunters or other nature observers to construct a camouflage screen. The fixture may include a clamp which can be attached to any existing stand, support structure or other tree branch as necessary to obtain optimal concealment, or a stake which can be anchored in the ground. Each clamp has two branch holders, which may be arranged at alternating angles or rotatably connected to the clamp. Each stake may have one or more branch holders, which may be fixed or rotatable. The branch holders may have set screws with knobs permitting branches to be secured at the optimal angle and position to conceal the hunter or nature observer and to resemble the growth pattern of natural foliage. The branch holders may also be rotatable to allow the user to further customize the camouflage screen.

7 Claims, 7 Drawing Sheets

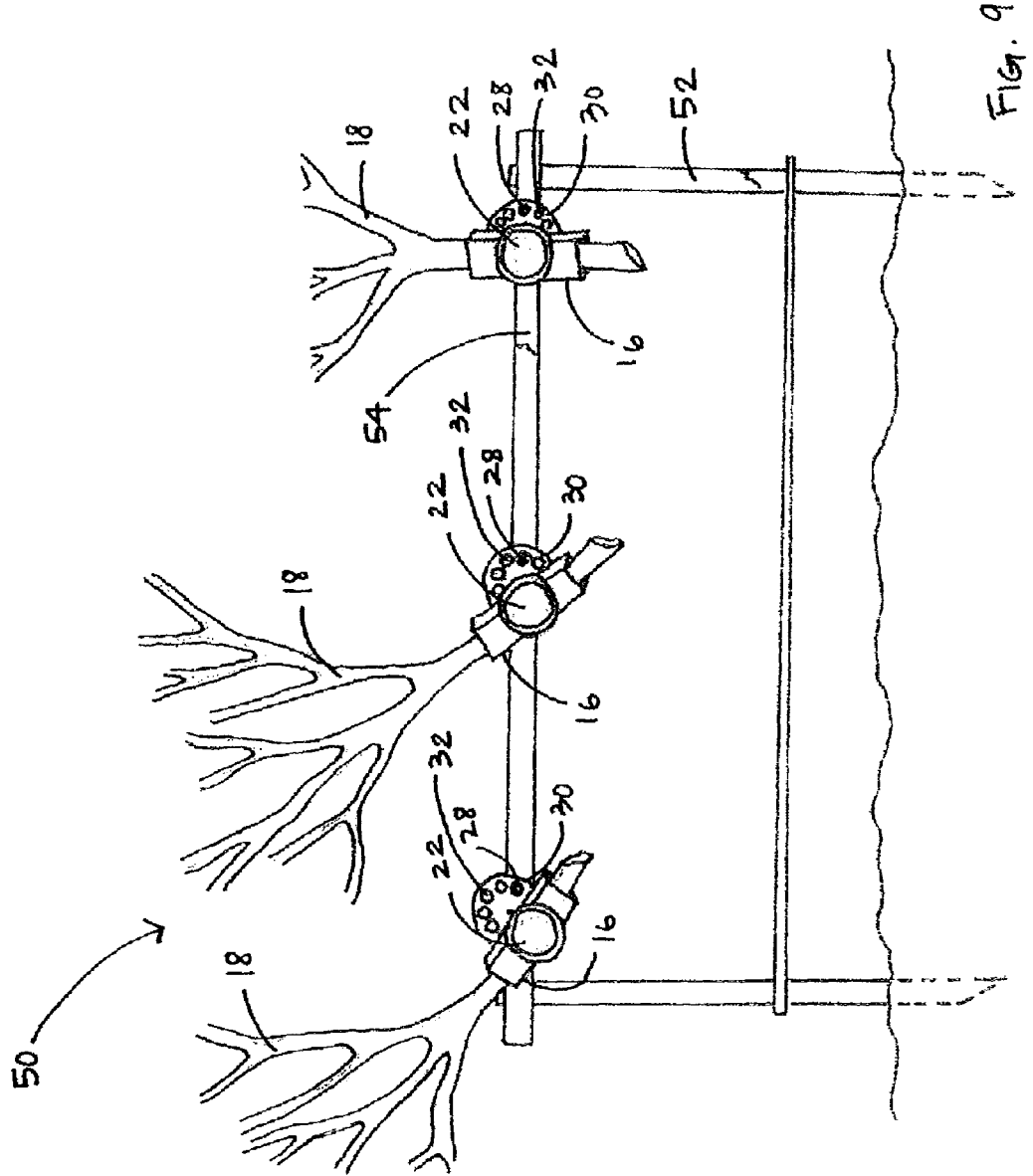

CAMOUFLAGE BRANCH HOLDING AND POSITIONING APPARATUS AND METHOD FOR USING THE SAME

CROSS REFERENCE TO RELATED APPLICATIONS

This application claims priority from U.S. Patent Application Ser. No. 61/142,517, filed Jan. 5, 2009.

FIELD OF THE INVENTION

The invention relates to the field of camouflage devices for use in an outdoor environment to conceal a hunter or other nature observer from wildlife.

BACKGROUND OF THE INVENTION

Hunters and others who spend time in natural settings to observe animals have long realized the importance of concealing themselves from game being hunted and from other potentially dangerous wild animals. Hunters and other nature observers have therefore developed scent camouflage techniques and visual camouflage techniques.

Camouflaged clothing as well as camouflage-printed material covers for tree stands or blinds are commercially available. Branch holders that are attached to tree stands or blinds were introduced as a more natural appearing alternative than the camouflage-printed material covers which tend to have sharp perimeter lines that may be visible to wildlife and which may be difficult to match to the particular foliage of a given location. Such branch holders are generally designed to hold individual branches in a fixed position on a tree stand, blind or other man-made structure.

SUMMARY OF THE INVENTION

The present invention is an apparatus and method for adjustably positioning camouflaging branches on or in front of objects to be camouflaged. In one embodiment, a clamp is provided with at least one branch holder, and the clamp can be clamped to a tree stand, a tree branch or other supporting structure for holding branches in any of a number of different positions, as desired by the user. In another embodiment, a stand with at least one movable branch holder is provided, which can be staked to the ground In the preferred embodiments, the branch holders can be secured in various orientations and positions as desired by the user. These and other objects, advantages and features of the invention will be more fully understood by reference to the description of the preferred embodiments and appended drawings.

BRIEF DESCRIPTION OF THE DRAWINGS

FIG. 9 is a plan view of the stake branch holder embodiment.

DESCRIPTION OF THE PREFERRED EMBODIMENTS

Figure 1:
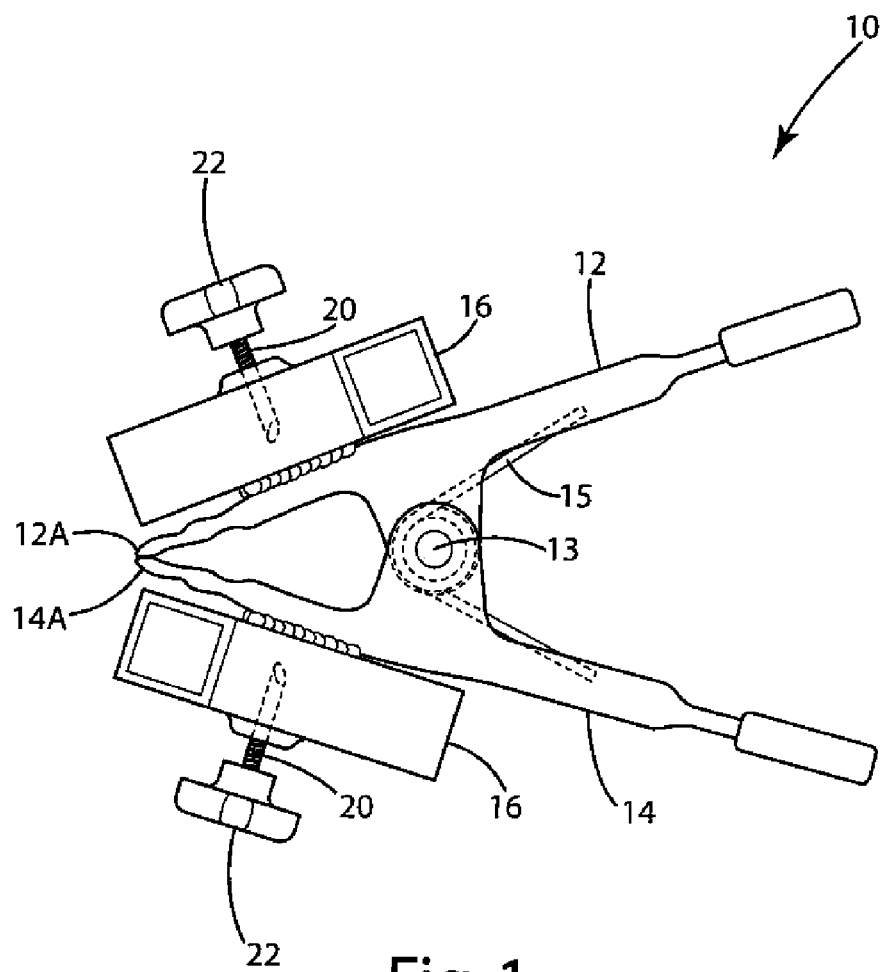
FIG. 1 is a side elevational view of a preferred embodiment branch clamp.
Figure 3:
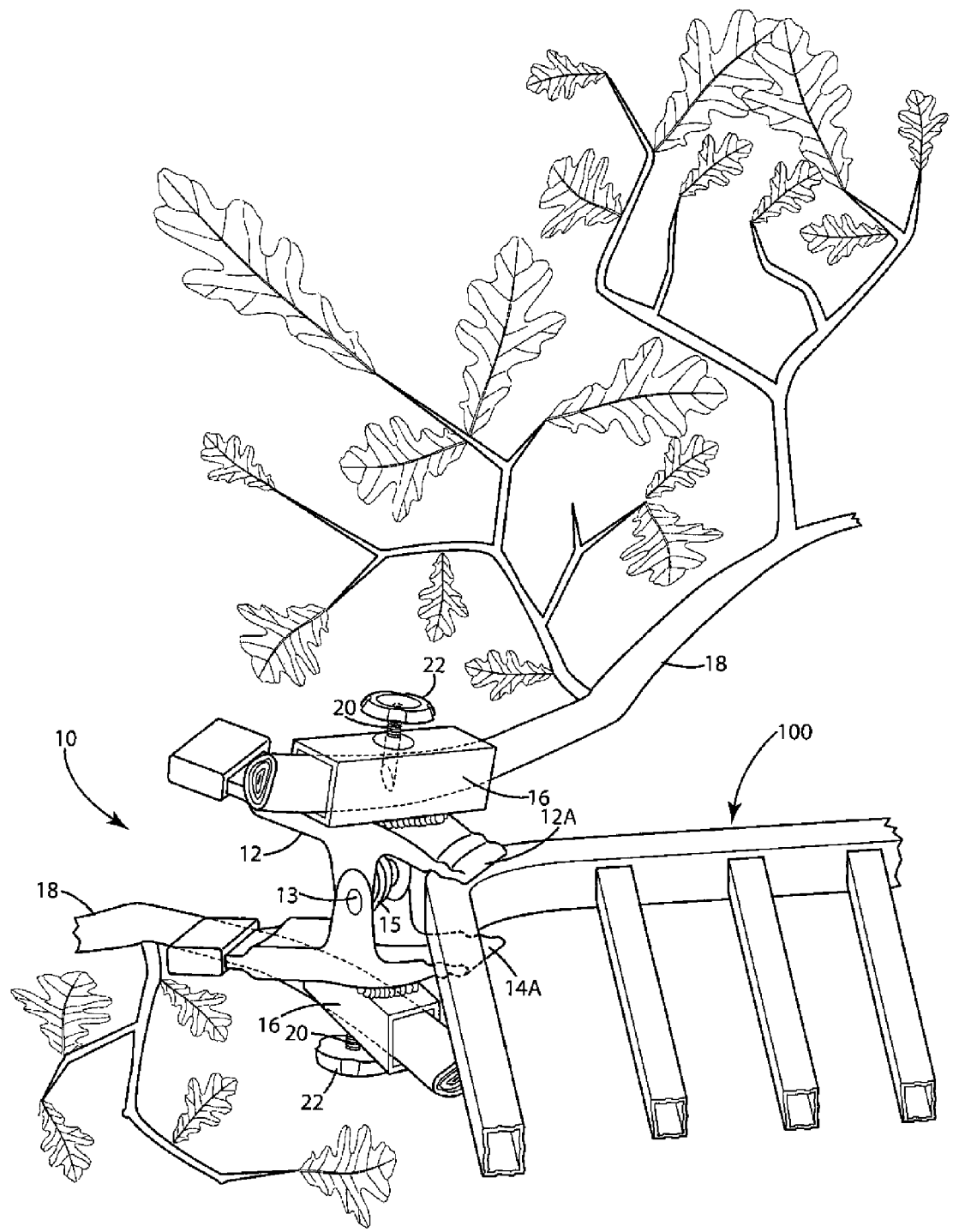
FIG. 3 is a perspective view showing a preferred embodiment clamp to a support such as a portion of a tree stand.

The preferred embodiment branch holder clamp 10 can be used to construct a camouflage screen using either natural materials found at the site of construction or natural or artificial branches or other materials that can be carried to the site where the camouflage screen will be used (FIGS. 1 and 3). Clamp 10 is small, portable, movable even when filled with branches, and readily adjustable to fit different sizes and types of branches and to be affixed to different locations without necessitating the use of any tools or specialized equipment. Further, clamp 10 is capable of holding branches in such a position so as to make them appear to be natural growth which comes from a single base in a fan-like arrangement.

Figure 2:
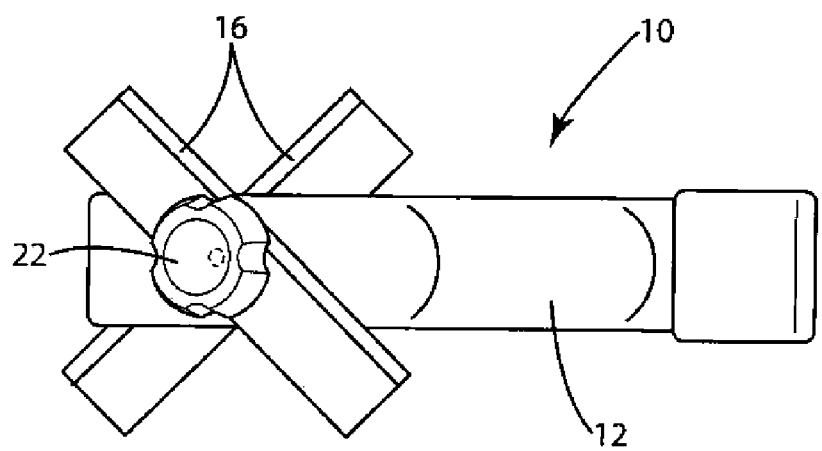
FIG. 2 is a top plan view of the clamp.

Clamp 10 comprises opposing clamping sides 12 and 14 pivotally joined on pivot axle 13, and biased to a clamping position by a spring 15. The clamping ends 12a and 14a grasp the element to which clamp 10 will be attached. On each side of the clamp 12 and 14 a branch holder 16 is attached which is capable of receiving the end of a natural or artificial branch element 18. In one embodiment, branch holders 16 are secured to clamping sides 12 and 14 by techniques such as welding, adhesion with adhesives or the like. In another embodiment, as further described below, the branch holders 16 are secured to the clamping sides 12 and 14 by techniques which allow the branch holders 16 to be rotated and secured at various angles to provide more realistic branch coverage. The branch holders 16 can be oriented at alternating angles, whether fixed or adjustable, such that the branch elements 18 will be oriented in a fan-like arrangement (FIGS. 2 and 3).

Each branch holder 16 includes an elongated screw 20 which, when threaded through the side of the branch holder can be tightened to hold branch elements 18 of different sizes and thicknesses securely in the desired orientation by being tightened to provide friction against the branch element 18. Screw 20 is threaded through any side of the branch holder 16 which is not attached to a side of the clamp 12 or 14. Each screw 20 has an adjustment knob 22 fastened on the end of the elongated screw 20 which is outside of the branch holder 16 such that the elongated screw 20 can be tightened to hold the branch element 18 quickly and securely by hand.

Figure 6:
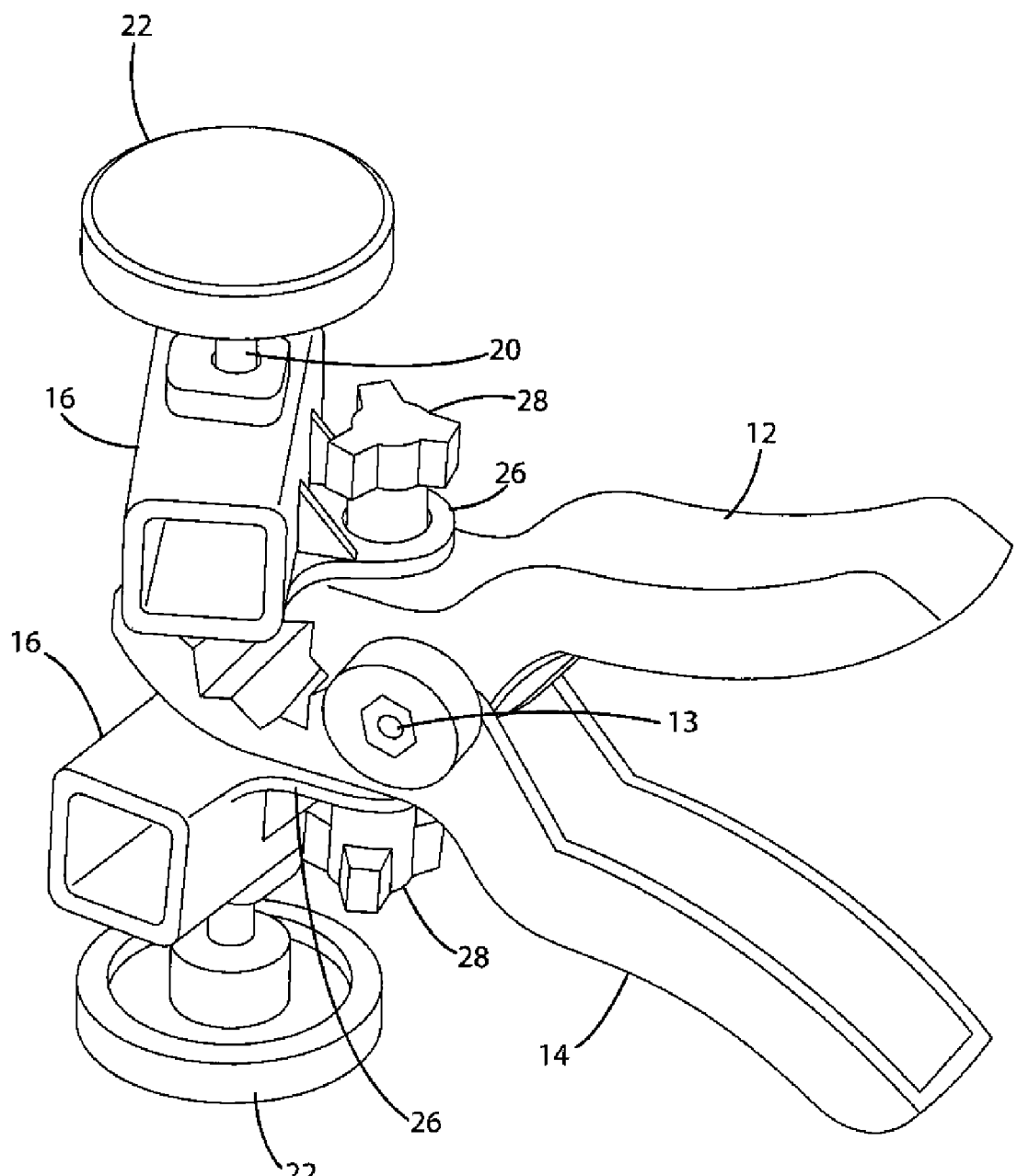
FIG. 6 is a top perspective view of a preferred embodiment with a locking knob for adjustment of branch holder.

Clamp 10 is a spring clamp or other type of clamp which can preferably be secured without the use of tools. The clamp 10 will be of a size sufficient to be clamped to the frame of a support structure, such as a standard tree stand or blind used by hunters or nature observers, or to be clamped to any existing foliage in natural surroundings, such as a spring clamp with a length of about six (6) inches. The portion of the clamp 10 to be secured to the tree stand, blind, natural foliage or other support structure may be shaped in a star-like pattern, as shown in FIG. 6, with teeth 24 extending into the portion of the clamp 10 where the clamp 10 will surround a tree stand or blind. The star pattern of teeth 24 allows the clamp to be secured at various angles around the support structure and allows for greater security of the clamp 10 in different orientations.

Branch holders 16 can be elongated pipe-like shapes of a size sufficient to receive one end of a branch element 18, for example, elongated hollow tubes with a circular, square or rectangular cross section of about one (1) inch. When fixed, such branch holders 16 will be oriented at about opposing 45 degree angles such that the branches 18 which are inserted into the branch holders 16 are oriented in a fan-like arrangement similar to two branches of natural foliage originating from the same base.

If additional variability of the positioning of the branches 18 is desired, the branch holder 16 may be adjustably connected to the clamp 10, allowing for the user of the clamp 10 to alter the direction of orientation of the branch holders 16. One manner of providing adjustability is to provide a tab 26 on the branch holder which extends parallel and adjacent to the clamp 10, with corresponding holes in the tab 26 and the clamp 10 such that a locking knob 28 can be inserted through the corresponding holes in the tab 26 and clamp 10, where the locking knob 28 is a hand-turned bolt which allows the orientation of the branch holder 16 to be manually adjusted by allowing the user to loosen the locking knob 28, rotate the branch holder 16 to the desired orientation, and then re-tighten the locking knob 28.

Figure 7:
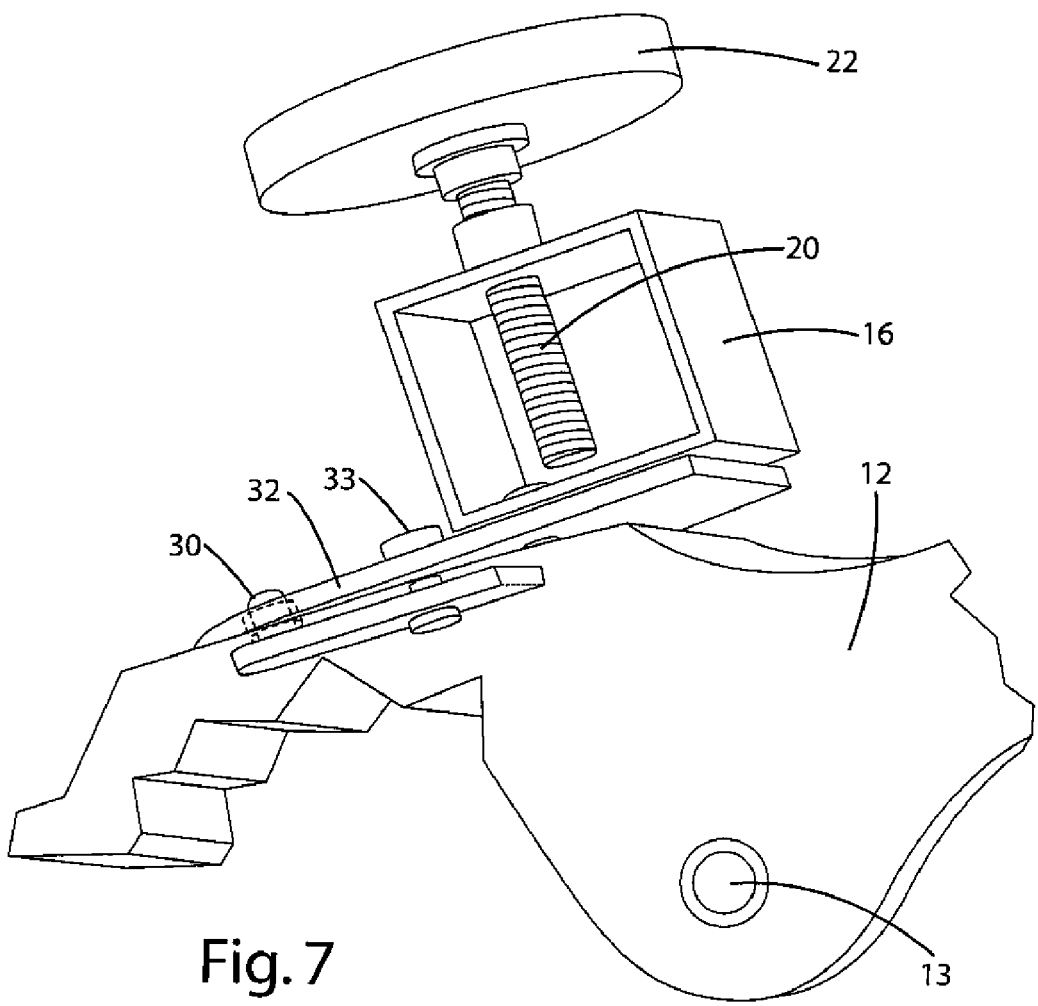
FIG. 7 is a side view of a preferred embodiment clamp with a receiving plate and spring button for adjustment of the branch holder, with one side of the clamp shown in a broken line to simplify the drawing.
Figure 8:
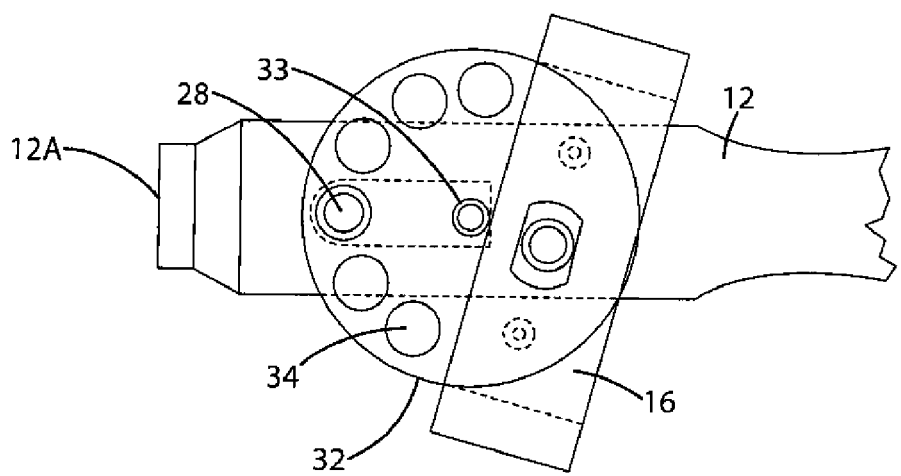
FIG. 8 is a top view of a preferred embodiment clamp with a receiving plate and spring button for adjustment of the branch holder.

Adjustability may also be achieved by placing a spring button 30 on the outer surface of each opposing side of the clamp 12, 14, preferably toward the clamping end of the clamp 10 from the branch holder 16. A plate receiver 32 is rotatably attached to the clamp 10 about axle 33. The plate receiver 32, as shown in FIG. 7, is preferably in a semicircular in shape, with openings 34 spaced around the perimeter of the plate receiver 32. The openings 34 are of a size and shape to engage the spring button 30 on the clamp 10, such that the branch holder 16 may be rotated and located in specific orientations such that it is latched into place by the spring button 30 extending through an opening 34 on the plate receiver 32.

Clamp 10, branch holder 16, elongated screw 20, branch adjustment knob 22 and any other visible element of the invention may also be covered in a low sheen rustic color or textured paint such that the elements will blend into natural surroundings.

Thus, preferred embodiment clamp 10 facilitates the placement of branch holders at alternating or movable angles on a clamp device which is easily portable, movable and attachable to a tree stand, blind or other natural or manmade supporting structure without the use of tools; provides an elongated screw threaded through the branch holders which are capable of being turned and tightened against natural or artificial branch elements using branch adjustment knobs which can be turned by hand; and provides the ability to hold both natural and artificial branch elements at a desired position and orientation by positive friction of the elongated screw against the end of the branch inserted into the branch holder and by allowing the rotation of the branch holder to be selected by the user.

Figure 4:
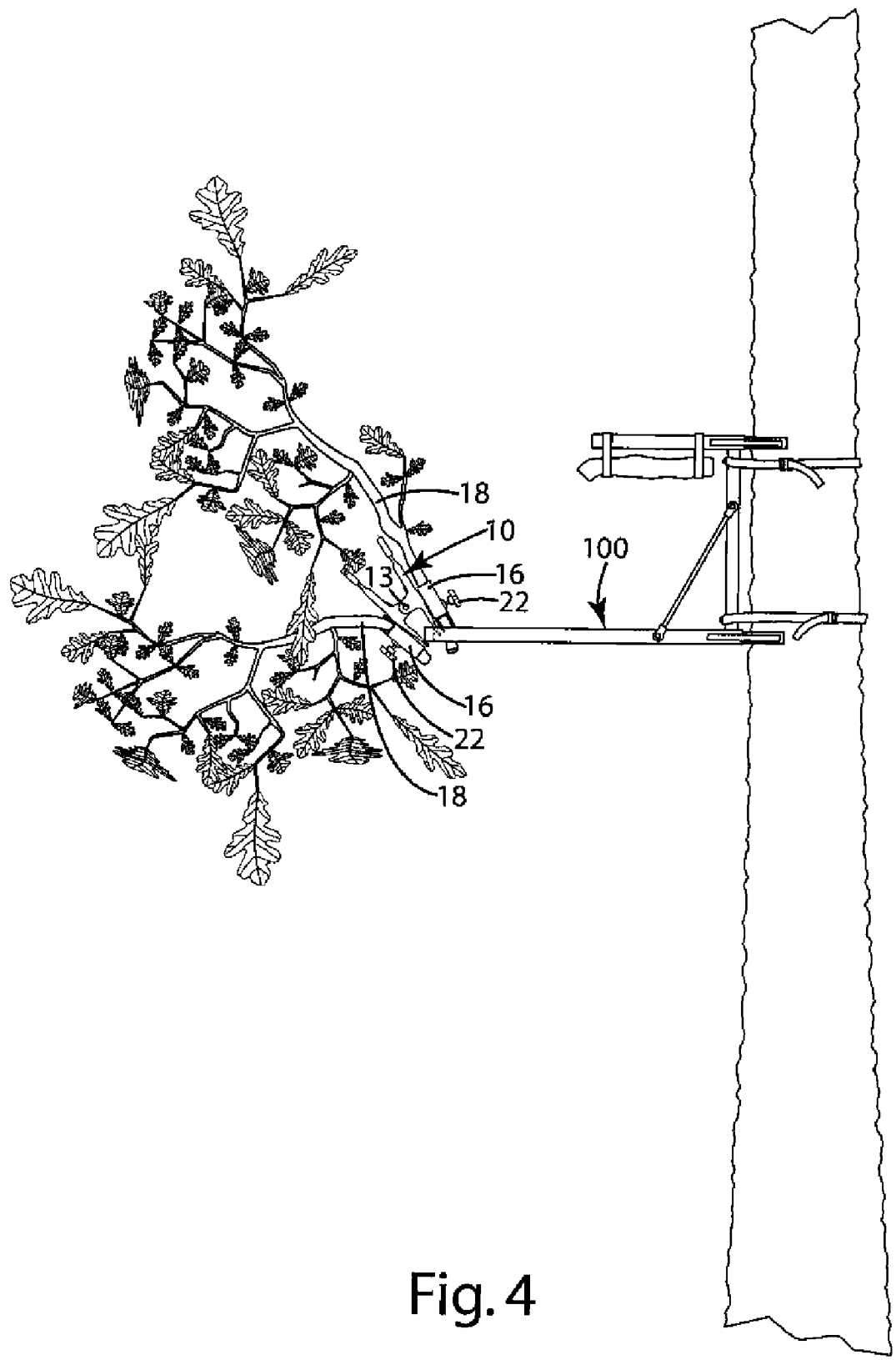
FIG. 4 is a perspective view showing a tree stand mounted on a tree with a preferred embodiment clamp clamped to the tree stand.
Figure 5:
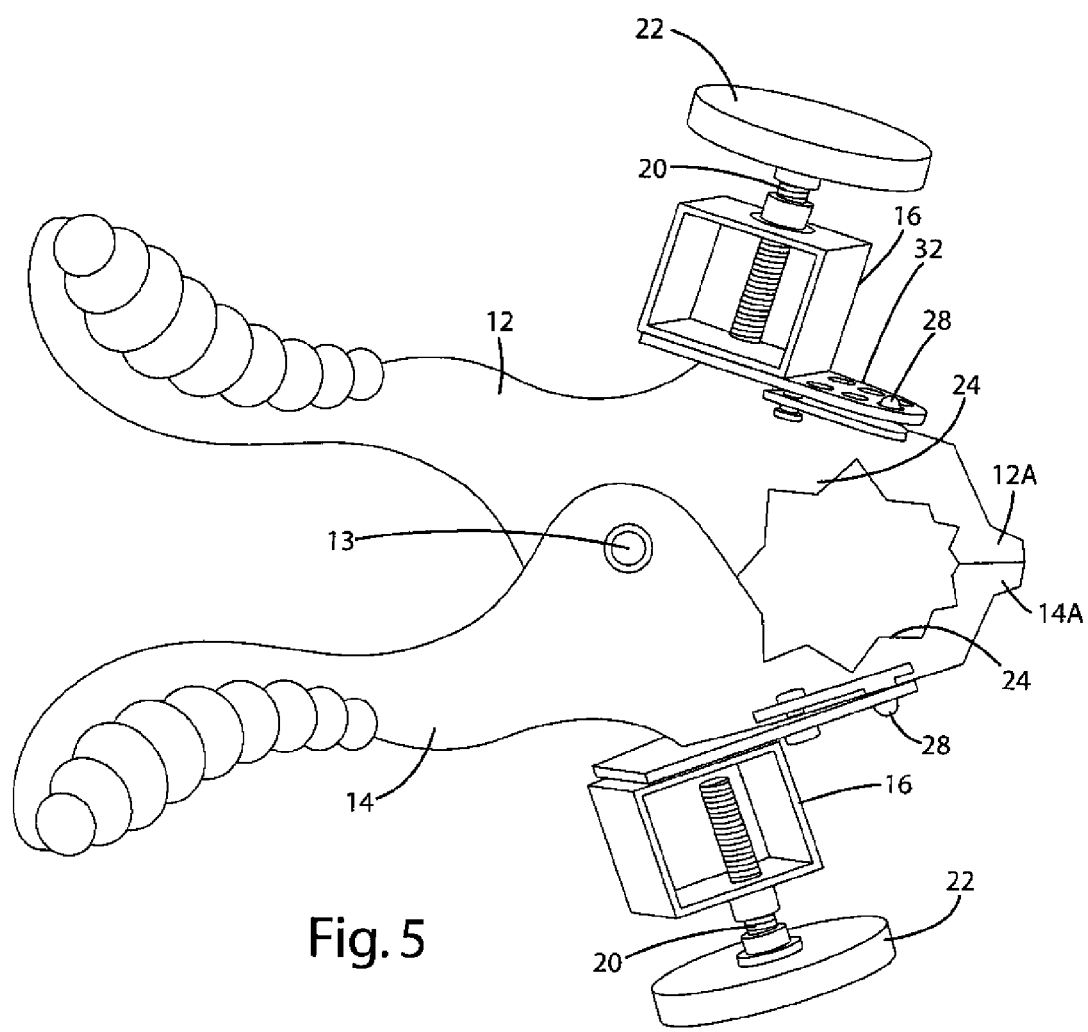
FIG. 5 is a top plan view of an embodiment of the clamp with a star-shaped jaw.

In use, branch holding and positioning clamps 10 are sufficiently small and compact that they can be carried in the user's pocket, or in small belt packs or backpacks. When the user arrives at the desired location, he or she can clamp branch holder clamps 10 to any convenient supporting structure. For example, he or she might clamp clamps 10 to a portion of a blind or a tree stand (FIGS. 3 and 4). Alternatively, clamps 10 can be clamped to existing branches of a tree, or other supporting member. Duck hunters can clamp the clamps to a portion of a boat. The user can then insert the ends of branches taken from the area, or artificial branches which have been carried to the spot, into the tubes comprising branch holders 16. The branches can then be clamped into various positions within branch holders 16 by tightening screws 20 against the branch 18. Thus the branches 18 can be positioned not only by varying the positions at which the clamps can clamp onto the supporting structure, but also by adjusting the rotational orientation of the branch holders or to some extent by adjusting the camouflaging branches 18 within branch holders 16. Screw members 20 also prevent the branches 18 from falling out of the branch holder clamp assembly 10.

In another preferred embodiment, the branch holders 16 as described herein may be attached to an assembly other than a clamp 10, such a stake assembly 50 with stakes 52 and a cross-piece 54. One branch holder 16 or several branch holders 16 may be attached to the stake assembly 50. The branch holders 16 may be connected rotatably to the stake assembly 50 using the mechanisms described above or any other known method so that natural or artificial branches 18 may be positioned in a fan-like arrangement to provide cover for a hunter on the ground or elsewhere where a screen of coverage is desired. The branch holders 16 may also have screws threaded through a side of the branch holder 16 to allow the user to fine-tune the position of the branches 18 and secure them in place.

While the current embodiments of the invention have been described in detail, it should be apparent that modifications and variations thereto are possible, all of which fall within the disclosure and scope of the present invention. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, several different types of clamp could be used to practice the present invention, and any number of different stake configurations and sizes could be used to practice the present invention. Additionally, any number of branch holders placed at any angles could be located on the clamp or stake assembly such that a natural-looking camouflage is achieved.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A camouflage branch holding apparatus comprising:
a clamp having two opposing members pivotally joined on a pivot axle making up the body of the clamp and defining two opposing clamp exterior sides in oblique angled relation to each other within a plane perpendicular to the pivot axle, wherein the clamp is biased to a clamped position by a spring;
a plurality of tubular branch holders fastened to each of the opposing exterior sides of the clamp, wherein each of the branch holders are adapted to be in oblique angled relation to each other within a plane parallel to the pivot axle and are each adapted to receive the end of a branch therein to create natural looking camouflage; and
an elongated set screw threaded through a side of the branch holder and extending inside the tubular frame thereof to engage and secure a branch inserted into the branch holder.

2. The camouflage branch holding apparatus of claim 1, wherein the screw is threaded through an exterior side of each of the branch holders.

3. The camouflage branch holding apparatus of claim 1, wherein the screw has an adjustment knob fastened on a distal end of the elongated screw outside of the branch holder so as to allow the elongated screw to be tightened to hold the branch element by hand.

4. The camouflage branch holding apparatus of claim 1, wherein each of the tubular branch holders have a square cross section of about one (1") inch.

5. The camouflage branch holding apparatus of claim 1, wherein each of the tubular branch holders have a circular cross section of about one (1") inch.

6. The camouflage branch holding apparatus of claim 1, wherein the tubular branch holders are oriented at about forty-five)(45°) degree angles one to the other such that the branches inserted into the branch holders are oriented in a fan-like arrangement.

7. A method for preparing a camouflage screen for a support structure, comprising:
   providing a support structure;
   providing at least one camouflage branch holding apparatus as described in claim 1;
   clamping at least one camouflage branch holding apparatus to the support structure; and
   inserting branches into the branch holders of the camouflage branch holding apparatus.

* * * * *